Jan. 4, 1949.
L. P. EVANS
2,458,358
PROCESS OF REGENERATING A MOVING
BED OF SOLID CATALYST
Filed March 14, 1944
4 Sheets-Sheet 1
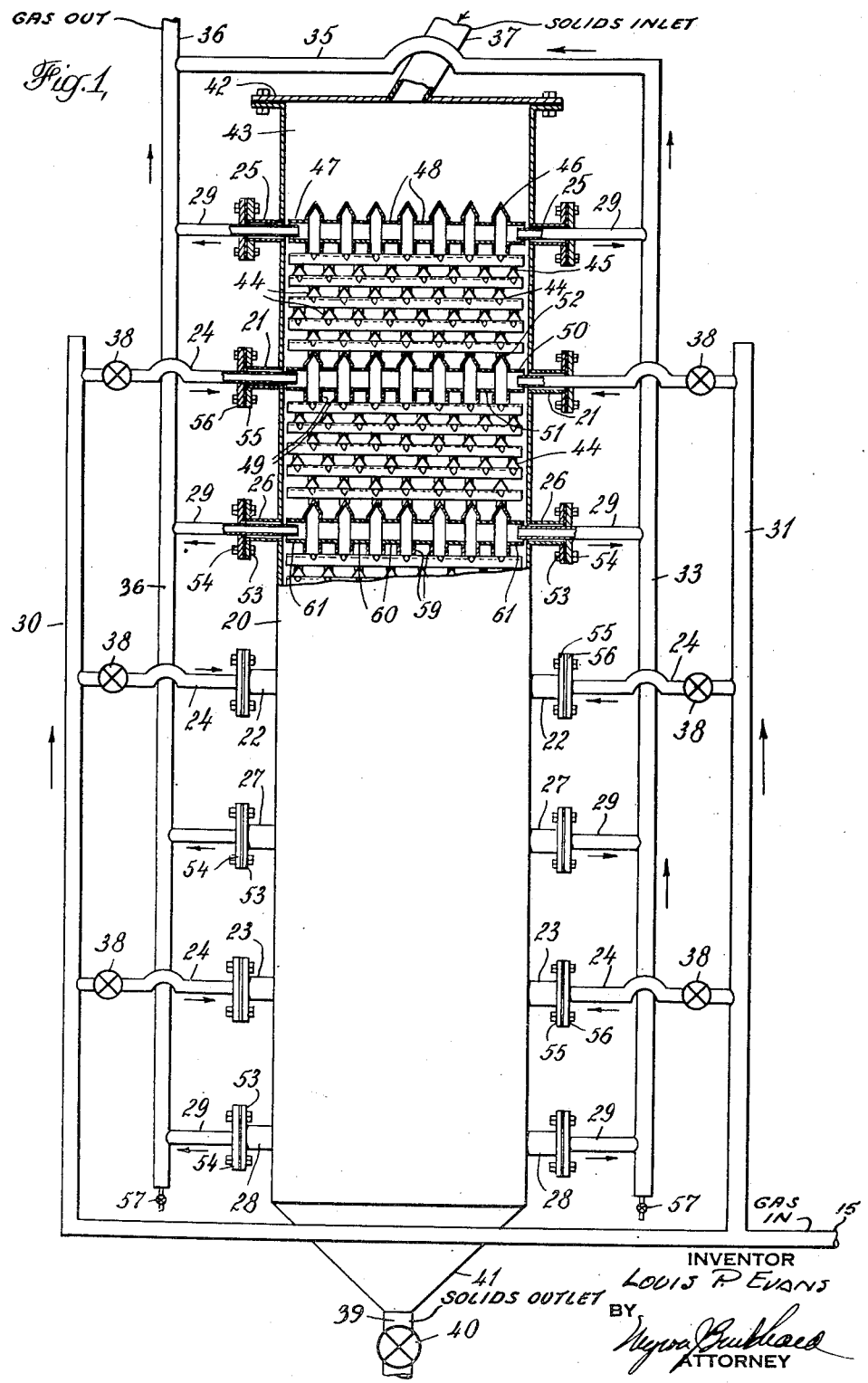
Fig.1,
INVENTOR
LOUIS P. EVANS
BY
ATTORNEY Jan. 4, 1949.  L. P. EVANS  2,458,358
PROCESS OF REGENERATING A MOVING
BED OF SOLID CATALYST
Filed March 14, 1944  4 Sheets-Sheet 2
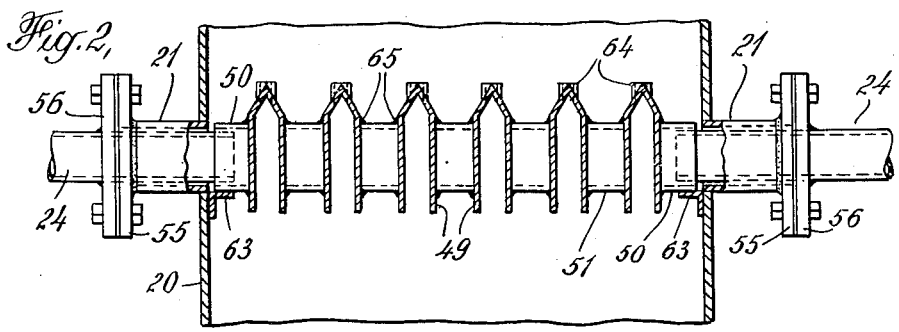
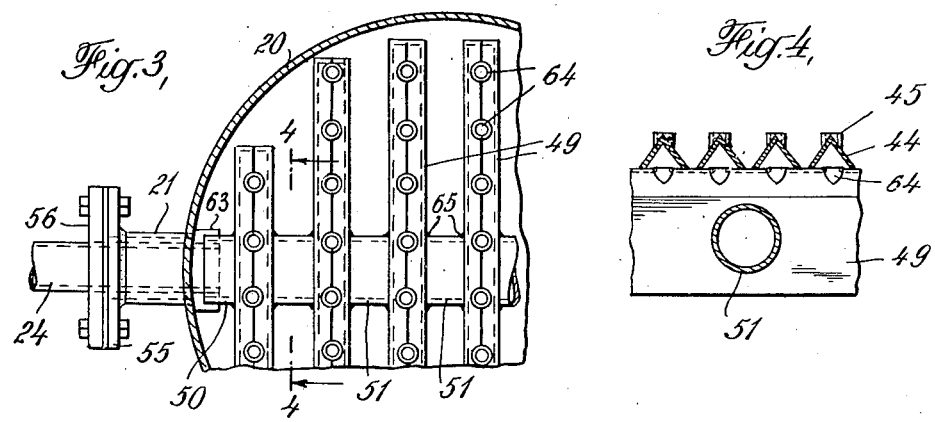
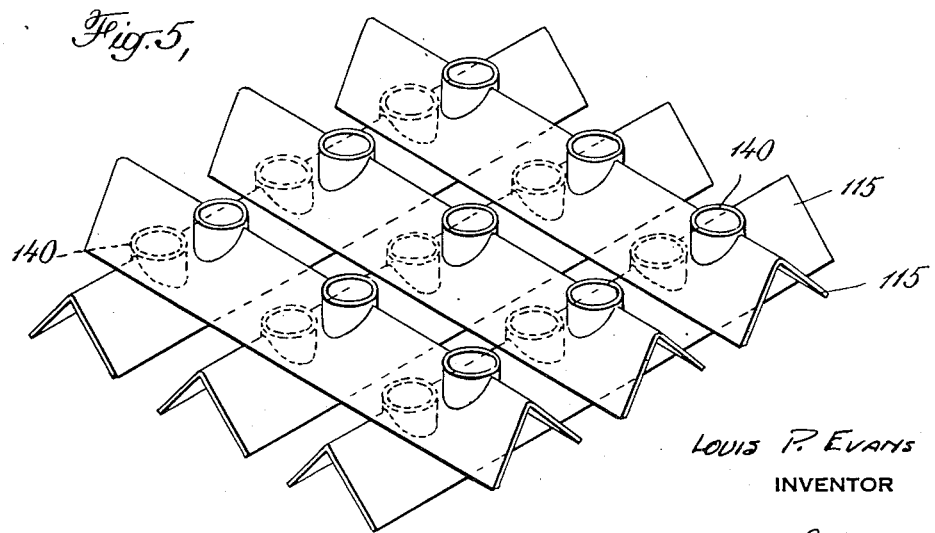
LOUIS P. EVANS
INVENTOR
BY
ATTORNEY Jan. 4, 1949.  L. P. EVANS  2,458,358
PROCESS OF REGENERATING A MOVING
BED OF SOLID CATALYST
Filed March 14, 1944  4 Sheets-Sheet 3
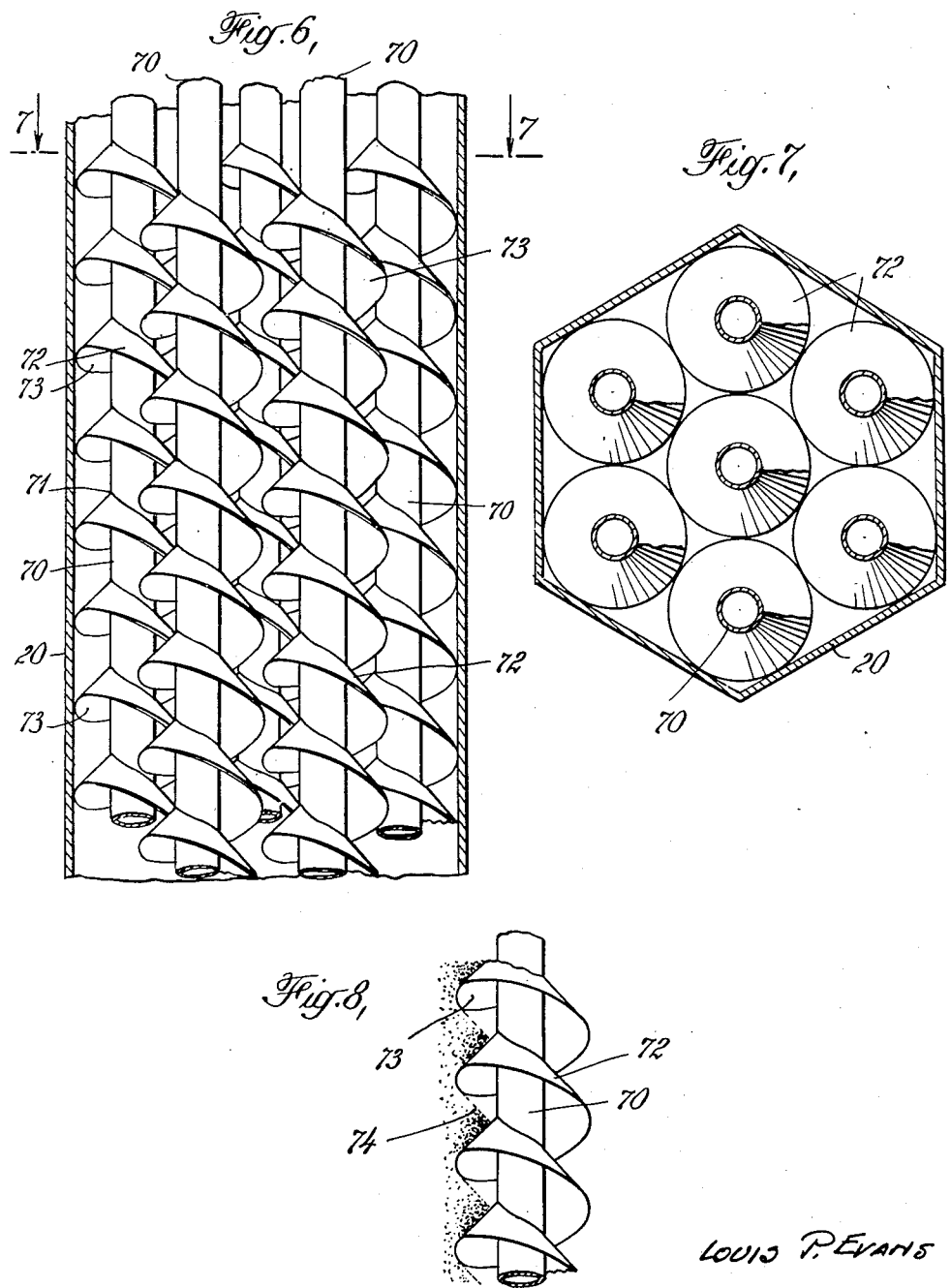
LOUIS P. EVANS
INVENTOR
BY
ATTORNEY Jan. 4, 1949.   L. P. EVANS   2,458,358
PROCESS OF REGENERATING A MOVING
BED OF SOLID CATALYST
Filed March 14, 1944   4 Sheets-Sheet 4
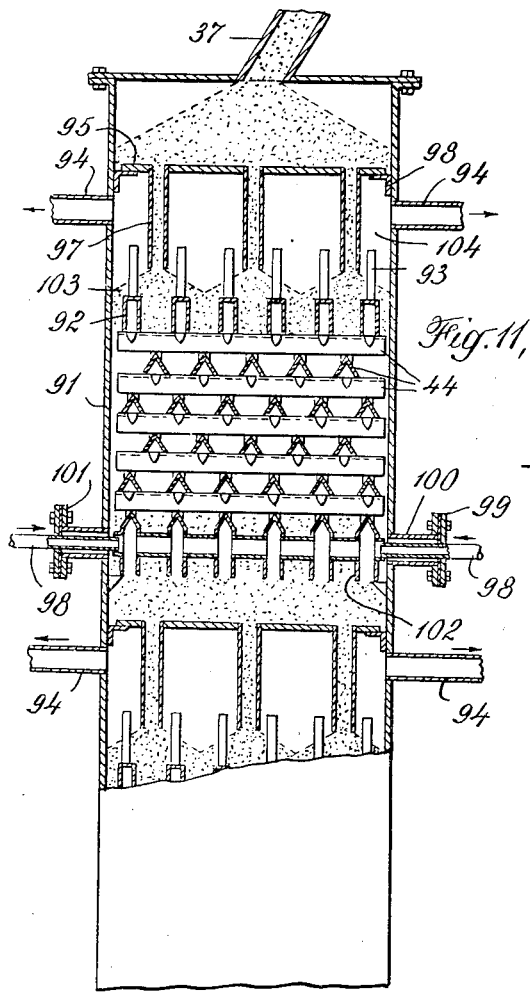
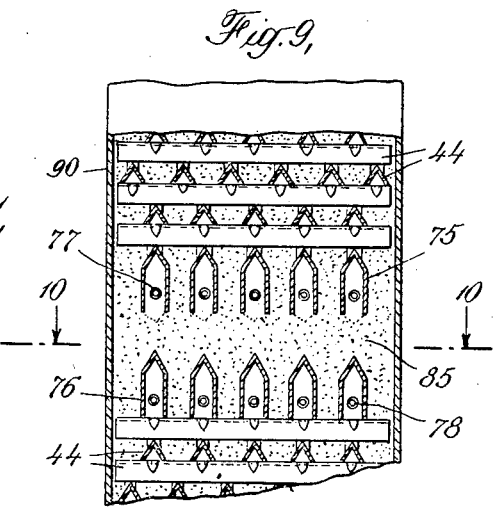
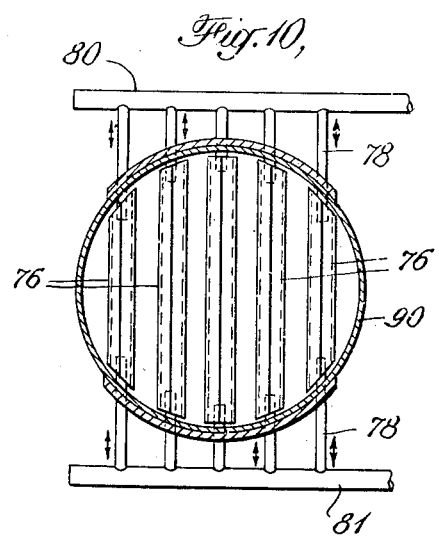
Louis P. Evans
INVENTOR
BY
ATTORNEY Patented Jan. 4, 1949

2,458,358

UNITED STATES PATENT OFFICE 2,458,358

PROCESS OF REGENERATING A MOVING BED OF SOLID CATALYST

Louis P. Evans, Woodbury, N. J., assignor to Socony-Vacuum Oil Company, Incorporated, a corporation of New York Application March 14, 1944, Serial No. 526,454

3 Claims. (Cl. 252—418)

This invention has to do with a method for conducting reactions of fluid reactants such as hydrocarbon vapors, oxygen, air, etc., in the presence of a substantially continuous moving column or bed of contact mass material which may or may not be catalytic to the desired reaction. Exemplary of the processes of this kind is the cracking conversion of hydrocarbons, it being well known that hydrocarbons of gas oil nature boiling between about 500° F. and 750° F. may be substantially cracked to gasoline by passing them at reaction conditions of temperature and pressure such as, for example, temperatures of the order of 800° F. and higher at pressures usually somewhat above atmospheric in contact with a solid adsorptive catalytic contact mass. Usually such contact masses partake of the nature of fuller's earth, or other natural or treated filtering clays and/or various synthetic associations of alumina, silica or alumina and silica, any of which may or may not have other constituents added such as certain metallic oxides. In a most recent form this operation has been developed as one in which the particle form solid contact material passes cyclically through zones or vessels in the first of which the cracking reaction takes place, usually at some super-atmospheric pressure, and in the second of which the contaminant materials formed upon the contact mass by the reaction are burned off usually at super-atmospheric pressure by means of a fluid regenerating medium such as a combustion supporting gas. In this cyclic process the particle form contact material passes through both reactor and regenerator vessels as a substantially continuous column or columns of moving contact mass material. It is of the utmost importance in the above process that during the regeneration of the contact material, its temperature level be maintained sufficiently high to support reasonably rapid combustion of the contaminant deposited thereon and yet below temperatures which would cause heat damage to said contact material. Since considerable quantities of heat are usually liberated by the combustion of the contaminant deposited on the contact material, it is usually necessary to provide in the construction of the regeneration vessel an adequate means for the removal of heat from the contact material in order to obtain the desired temperature control thereof.

This invention has specifically to do with a method of operation of a reaction or regeneration vessel wherein exothermic or endothermic gaseous or gas-solid reactions are conducted in the presence of a substantially continuous column or columns of particle form contact mass material moving continuously through said vessel, said vessel being of such construction and being capable of such operation as to permit maintenance of the contact material flowing therethrough at a temperature equal to or above that which will support reasonably rapid gaseous or gas-solid reaction and below that which would cause heat damage to the contact material.

Heretofore in the construction of such regeneration vessels, it has been necessary to provide heat transfer surface such as tubes through which a fluid heat transfer or cooling medium is circulated in order to insure adequate removal of heat from the contact material during the regeneration. Such regenerators permit very excellent control of contact material temperatures, if properly designed, but the construction and operation of the heat transfer medium portion thereof are costly. Consequently, it would be highly desirable to have available a regenerator wherein the contact material flows as a substantially continuous column or columns of particle form solid material and wherein the temperature level of said contact material is controlled between the desired temperature levels during the combustion of contaminants therefrom, said temperature control being accomplished by the use of sufficient quantities of combustion gas or mixtures of combustion supporting gas and inert gas to remove the excess heat liberated by the contaminant combustion as well as to support said combustion.

In order to permit the flow through the regenerator of sufficient quantities of gas to support combustion and remove the excess heat liberated by said combustion, it has been found convenient to provide baffles within the regenerator which serve to form passageways through the regenerator for gas flow which are kept substantially free of contact material. If the cross-section of these passageways is sufficiently large, most of the gas passes therethrough and contacts the contact material in the regenerator mainly at those edges of the passageway bounded by contact material particles. It has been found, however, that more efficient utilization of the regenerator gas throughput both for supporting combustion and for heat removal purposes and higher regenerator burning capacities may be obtained by causing the flow of a substantial amount of gas through the flowing packed contact material mass as well as over the surface thereof through gas passageways.

A major object of this invention is the provision of a regeneration zone through which contact material continuously passes as a substantially continuous column or columns of particle form contact mass material and wherein contaminant deposit is removed from said contact material by the action of a combustion supporting gas and wherein the excess heat liberated by contaminant combustion is simultaneously removed from the contact material and from the regeneration zone by use of an adequate excess of combustion supporting gas, or admixture thereof with inert gas of initial temperature substantially below that of the contact material, thereby permitting the maintenance of the contact material during the regeneration at a temperature above that required to support contaminant combustion and below that which would cause heat damage to the contact material.

It is a specific object of this invention to provide in such a regeneration process, as above described, a positive method for control of the rate of combustion and of the rate of heat removal from various sections of the regeneration zone thereby permitting maintenance of desired contact material temperatures and contaminant burning rates in various sections of the regeneration zone and thereby preventing the overcooling or overheating of the contact material in certain localized sections of the regeneration zone.

It is a further object of this invention to provide in a regeneration process of the type above described, a method of permitting the flow through said regeneration zone of sufficient quantities of gas for contaminant combustion and for proper contact material temperature control without causing pressure drops due to the flow of said gas which would seriously interfere with or interrupt the normal flow of contact material through the regeneration zone. It is a further object of this invention to provide in a regeneration process, such as above described, a method of causing the flow of a substantial amount of gas through the contact material mass flowing downwardly through the regenerator, thereby insuring improved utilization of said gas both for support of combustion and for removal of heat from the contact material and the regenerator and thereby increasing the contaminant burning capacity of said regenerator.

In order to readily understand this invention reference should now be made to the figures attached hereto of which Figure 1 is an elevational view, partially in section, of such a regenerator; Figure 2 is an elevational view, partially in section, of a typical gas inlet or outlet section of the regenerator. Figure 3 is a sectional plan view of the arrangement shown in Figure 2. Figure 4 is a detailed view of part of one of the gas inlet channels. Figure 5 is an isometric sketch showing the arrangement of a section of the angle shaped baffles in a regenerator burning stage. Figure 6 is an isometric view, partially in section, showing the arrangement of a section of an alternate type of gas flow baffles for use in such a regenerator burning stage. Figure 7 is a plan view of the same baffle arrangement shown in Figure 6. Figure 8 is an isometric sketch of part of one of these gas flow baffle elements. Figure 9 is an elevational view, partially in section, of a regenerator having a modified form of gas inlet and outlet arrangement. Figure 10 is a sectional plan view taken at the line 10—10 in Figure 9. Figure 11 is an elevational view, partially in section, of a similar regenerator having another modified gas outlet arrangement. All of the above figures are purely diagrammatic in form.

Turning now to Figure 1, we find a regenerator 20 consisting of a burning section, a contact material surge section 43 and a contact material drain section 41. Connected in pairs to opposite sides of the regenerator shell 20 and at spaced intervals along its length are the nozzles 21, 22, and 23 through which are inserted gas inlet pipes 24, and which pipes are connected to and supported by said nozzles by means of flanges 55 on said nozzles and flanges 56 on the inlet pipes 24. Similarly connected in pairs to opposite sides of the regenerator shell and at intervals alternating with the above nozzles are the nozzles 25, 26, 27 and 28 through which are inserted the gas outlet pipes 29, which nozzles are similarly connected to and support said pipes by means of flanges 53 and 54.

Within the regenerator and opposite each pair of nozzles 21, 22 and 23 are the gas distribution channels 49. Turning now to Figure 2, we find 20 is the shell of the regenerator; and extending from wall to wall therein, we find a grid work composed alternately of certain inverted, narrow, gable-roofed, trough-like members 49, between each of which there is a tubular spacer 51 and upon the outboard side of the trough member 49 at either end, there is an end member 50. The trough members 49 extend from wall to wall of the regenerator in a direction perpendicular to the plane of the drawing Figure 2. The spacer members 51 and end members 50 are connected to the proper orifices in the side walls of each trough 49 at the proper point so as to constitute in effect a single tubular passage extending from wall to wall of the regenerator with which the interior of each trough member 49 is in full communication. Thus any gas introduced at either end of this central tubular member flows into the trough-like members and then is in a position to flow out uniformly over all portions of the reactor cross-section through appropriate passageways later detailed. The trough members 49 and spacers and end members 51 and 50, respectively, are most conveniently assembled by welding as at 65.

When the above inlet arrangement is properly placed within the regenerator, the end members 50 are in register with the nozzles 21, 22 and 23 and a pipe or sleeve 24 passes through each of said nozzles and the open end thereof slips a short distance into the end members 50. The other end of the pipe 24 is connected to a gas inlet riser pipe 30 or 31 thereby placing the distributor channels in communication with the external gas inlet pipes. Each pipe or sleeve 24 being welded to a flange 56 and connected thereby to flange 55 on the end of a nozzle 21, 22 or 23, may also serve to support the inlet channel arrangement within the regenerator or, if desired, the main support may be supplied by other means such as angle supports 63 which are connected to the shell 20.

Turning now to Figure 3, we find a plan view of a portion of the grid assembly showing the regenerator shell 20, the several troughs 49, several spacers 51, one end member 50, one nozzle 21 and one inlet pipe or sleeve 24 with attached flange 56.

Spaced at proper intervals along the gable roof of troughs 49 are the orifices 64 which serve as passageways for inlet gas from the troughs to the passageways under the burning stage gas flow baffles to be described hereinafter. The arrangement of these orifices is shown clearly in Figure 4, which is a section of part of a trough showing the orifices 84 covered by the members 44 of the bottom row of burning stage baffles.

Positioned within the regenerator, opposite the pairs of nozzles 26, 27 and 28 and outlet pipes 29 are gas outlet channels 59 and spacers 60 therebetween, which channels are placed in communication with the external gas outlet riser pipes or ducts 33 and 36 by means of pipes or sleeves 29, each of which slips through a nozzle 26, 27 or 28 into an end spool 61 connected to an outboard channel 59. It can be seen that the construction of the outlet channel arrangement is similar to that of the inlet channels except in the case of the row of outlet channels at the top of the regenerator. These channels differ in that there are no ports or orifices provided in the gable roofs thereof, in order to prevent contact material from falling under the channels. These outlet channels 46 are spaced by spacers 48 and are placed in communication with the external gas outlet riser ducts 33 and 36 by means of sleeves 29 which slip through nozzles 25 into the end spools 47 connected to the outboard channels 46.

Turning again to Figure 1, we find stacked within the regenerator between the gas inlet and outlet channels, an arrangement of baffles consisting of a number of rows of inverted angle irons 44 placed one above the other in a criss-cross manner, each angle iron extending horizontally across the regenerator. Along the heel of each angle iron are a number of orifices 45, so located that those in one angle iron will be directly below the closed part of the next above angle iron. In this manner, depending on the direction of gas flow, each orifice distributes gas into the space beneath the angle iron above or below, yet gas cannot pass directly through another orifice. In short, the arrangement is such that the orifices when assembled are not in register. In Figure 5 is shown a study of the stacking of these angle baffles. It should be understood that these baffles may be used in regenerators of any desired cross-sectional shape.

It will be seen from the above description that in operation a substantial fraction of the gas charged to the regenerator may pass therethrough by way of substantially particle free tortuous paths under the angle iron baffles; and at the same time the gas is in direct contact with the catalyst in the regenerator at the exposed catalyst surface forming the bottom boundaries of the gas passageways. The result of this arrangement is a very effective distribution and re-distribution of both down-flowing contact material or catalyst and up-flowing or down-flowing gas. Moreover, by proper angle iron spacing, the maximum distance of any contact material particle from a cooling surface, such as the angle iron surface or the contact material gas contact surfaces thereunder may be easily regulated.

Furthermore when the angle irons are properly designed, as hereinafter specified, the pressure drop due to the gas flow from angle to angle induces a substantial gas flow through the mass of flowing particle form contact material. This not only encourages more efficient utilization of the charge gas for contaminant combustion and contact material temperature control and much higher regenerator burning capacity, but also is very essential to the proper operation of this invention as will be shown hereinafter.

Turning again to Fig. 1, it can be seen that the row of angle iron baffles resting on top of a gas inlet or outlet channel are placed so as to cover the orifices in the gable roof of said channels and the row of angles immediately below gas channels are arranged so that the orifices in the angles are under the channels. Thus there are provided continuous shielded gas passages through the regenerator. In the arrangement shown, the angle iron baffles are supported in the regenerator by the gas inlet and outlet channels.

From the above, it can be seen that the regenerator is divided into a number of superposed burning stages, each stage being in free contact material communication with the one above and below and each stage having an inlet and outlet means for its individual and separate supply of combustion and cooling gas.

In operation, combustion supporting gas such as air in excess of that required for contaminant combustion or a mixture of air and flue gas pass from a compressor (not shown) through pipe 15 into riser pipes 30 and 31 and therefrom through inlet pipes 24 under the inlet channels 49 in the various stages along the length of the regenerator. The air is distributed by the channels 49, half to the top row of angle irons 44 below the channels. Thus the air flows upwardly and downwardly through alternate burning stages and is removed through outlet channels such as 59 and 46 and pipes 29 to outlet flue gas riser pipes 33 and 36. It will be seen that each set of inlet and outlet channels serves as common inlet and outlet for two adjacent superimposed burning stages, with the exception of those channels situated on either end of the regenerator which serve as outlets for the end stages only.

The combustion and cooling air is charged to each stage at a temperature substantially below that of the contact material therein and by removing heat from said material is heated in its passage through the burning stage. By proper control of the air inlet temperature and its rate of flow to each individual burning stage by means of valves 38 in the inlet pipes 24, the temperature of the contact material and the rate of contaminant combustion in each burning stage may be regulated as desired.

The spent contact material is charged continuously through pipe 37 into the surge zone 43 at the top of the regenerator and then passes through the successive burning stages as a substantially continuous column or columns of particle form material.

The regenerated material discharges through the regenerator drain section 41 and discharge pipe 39 and finally through the flow control and throttle valve 40 inserted in the pipe 39.

The construction of the apparatus shown in Figure 1 may be modified in several ways, for example, instead of the angle iron baffles shown above, a spiral finned type of baffle may be used in the burning stages. Such baffles have been shown in U. S. Patent 2,226,535, but for convenience, a brief description of these baffles will be given herein.

Such baffles are shown in Figure 6 in which 20 is the regenerator shell, 70 are vertical support rods or tubes which would be connected through and supported by the tops of the gas inlet and outlet channels (not shown) and 72 are the sloping fins wound around the tubes 70 in the form of a helix and connected to said tubes by welds along the inner edges of said fins as at 71. In Figure 7, we find a plan view of this arrangement in which 20 is the regenerator shell which is shown hexagonal in cross-sectional shape but which may be of any other desired shape. Also shown are the tubes 70 and fins 72.

In Figure 8 is shown a section of one of these tubes 70 and attached fin 72 showing how the fins are sloped from the tubes 70 so as to form a continuous helical contact material free gas passageway 73 under said fins and so as to cause the contact material to form a gas contact surface 74 below said fins.

In order to permit use of the above arrangement, the necessary changes should be made in the gas inlet and outlet channel arrangements to permit free flow of gas to and from the gas passageways 73 under the fins 72. It will become obvious to those skilled in the art that the method of operation and the function of the spiral fin baffles and that of the angle iron baffles shown previously are similar and that any other baffles operating on the same principles and serving the same purpose are equally applicable to the apparatus of this invention.

Gas inlet and outlet arrangements somewhat different than those shown hereinabove may also be used. For example, individual inlet and outlet channels may be used for each burning section instead of common inlet and outlet channels for adjacent sections. Such an arrangement is shown in Figures 9 and 10 of which Figure 9 is an elevational view, partially in section, of a part of a regenerator and Figure 10 is a plan view taken at line 10—10 of Figure 9.

Reading these figures together, we find two superposed rows of channels 75 and 76, extending horizontally across the regenerator confined by shell 90 and vertically spaced so as to leave a space 85 which during operation is filled with a closely packed particle form downwardly flowing contact material.

Passing through and connected to the shell 90 of the regenerator are the pipes 77 and 78 which extend a short distance under the opposite ends of the channels 75 and 76, respectively. As can be seen in Figure 10, the other end of these pipes, such as 78, connect to external gas duct manifolds such as 80 and 81 thereby placing the channels in communication with the external gas inlet or outlet ducts as the case may be.

Above and below the channels 75 and 76, respectively, are shown angle iron baffles 44 of two regenerator burning stages. It will become apparent that with this arrangement, the gas flow may be upward and downward in alternate burning stages in which instance the channels 75 are gas inlet distributors and channels 76 are gas outlet channels, or the flow may be either upward or downward in all the stages or any desirable combination thereof in which case the rows of channels 75 and 76 may be either both inlet or both outlet members. This gas flow independence of the various burning stages is made possible in part by the space 85 which in operation is filled by a column of contact material which column of flowing contact material should be of such vertical length as to prevent flow of large quantities of gas therethrough under regenerator operating conditions. This arrangement has the advantage over that shown in Figure 1 insofar as each burning stage may be independently controlled whereas in the regenerator of Figure 1 only each pair of burning stages could be separately controlled.

It is sometimes desirable, when extremely high gas throughput rates are to be encountered in the regenerator operation to provide additional disengaging and contact material settling space at the gas outlet sections of the regenerator. Thus Figure 11 is an elevational view, partially in section, of the top portion of a regenerator 91 having a construction similar to that of the regenerator shown in Figure 1 except for modification of the gas outlet section thereof. In this arrangement channels 92 are placed horizontally across the top row of angle iron baffles 44 so as to cover the orifices therein. Pipes 93 are connected at spaced intervals through the top of channels 92 and extend up through the accumulation of contact material 103 into the space 104 wherein any small quantities of gas entrained contact material may separate and settle. The effluent gases pass from space 104 through pipes 94 connected to the shell near the upper end of the space 104.

The various burning stages are separated by plates 95 which extend across the regenerator and are supported from the shell by angle iron braces 96 or other suitable means. Passing through the plates 95 and depending therefrom are the open end pipes 97 which deliver the contact material from the bottom of one stage to the accumulation of contact material 103 on top of the stage below. As can be seen the gas flow through each stage of this regenerator is upward and individual rows of inlet channels 102 and outlet channels 92 are provided for each stage.

It will be seen that in all the above modifications of the method of this invention, the regenerator has been divided into a number of superposed burning stages through which the contact material passes in series, each of said stages having means for introduction and withdrawal of combustion supporting and contact material cooling gas. It is believed that such an arrangement in a regenerator of this type is a new and novel contribution to the art which offers certain very important advantages.

In the first place, since the total gas flow introduced to the generator is split up between a number of stages rather than being all forced to flow through the gas passageways and contact material in the entire length of the regenerator, it follows that for the same baffle construction more gas may be passed through the regenerator in contact with a given volume of clay without causing undue pressure drop due to its flow therethrough. This permits introduction of sufficient gas to insure proper contact material temperature control in some instances where it would be practically impossible to do so in former types of regenerators without causing pressure drops that would interfere with the flow of the contact material through the regenerator. Furthermore, with this new improvement, it becomes possible to design the gas flow baffles so as to allow less gas space and more contact material space than heretofore, thereby increasing the contact material volumetric capacity of the regenerator.

In the second place, by introducing the combustion and cooling gas in fractions to a plurality of zones and withdrawing said fractions from a second plurality of zones instead of introducing and discharging all of the gas to and from only one or two localized zones in the regenerator, overcooling or overheating of the contact material at certain localized zones in the regenerator is avoided making possible more difficult operations than were heretofore possible. Moreover, since the gas flow to each set of two burning stages or even to each burning stage may be separately and positively controlled, the flexibility of operation of the regenerator and the fineness of control of said operation is greatly increased, making possible the control of different contact material temperature and contaminant burning rates at different stages of the regeneration reaction and in different stages of the regenerator. Inasmuch as the composition of a contaminant deposit is known to change during the burning thereof, thereby changing its burning characteristics, the ability to so control the burning temperature and rate of various stages of the burning operation is of considerable importance in order to obtain the maximum burning capacity from the regenerator.

It will become obvious that the effluent gas from any burning stage may be introduced to any other burning stage with or without intermediate temperature regulation, as and when desired, by provision of suitable manifolding of a type which is well known to the art.

The number of burning stages which should be provided in a regenerator is dependent upon the length of the regenerator which in turn is dependent upon the amount of contaminant deposit on the contact material and upon the rate of contact material flow. In general it has been found that burning stages varying from 6 inches to 15 feet in length in regenerators ranging in total length from 6 feet to 50 feet may be used in the apparatus of our invention. Burning stages varying from 2 to 8 feet in length have been found preferable from practical considerations. Moreover, it has been found desirable to vary the lengths of the different burning stages in the same regenerator for certain applications. In this way the catalyst residence time between gas inlets and gas outlets may be controlled in some proportion to the change of rate of heat release at different stages of the burning, thereby permitting even more uniform catalyst temperature control throughout the catalyst regeneration.

As has been heretofore mentioned, it is of considerable importance that the angle iron baffles or other modifications of gas flow baffles be so designed as to cause pressure drops (hereinafter shown as $\Delta P$) due to the normal flow of gas through the passageway formed by said baffles so as to induce the flow of a substantial quantity of gas through the flowing mass of contact material in the regenerator. It has been found that unless $\Delta P$ is great enough at the desired gas rate to induce substantial gas flow through the contact material, the rate of contaminant combustion may be undesirably slow. Consequently, in such instance wherein the gas flow baffles are so designed that at the desired gas flow rate the pressure drop is very low the rate of gas flow would have to be increased above the desired volumetric rate in order to obtain a favorable pressure drop. The resulting rate of gas throughput required to obtain a favorable pressure drop and burning rate may be so great as to overcool the contact material thereby slowing or stopping the combustion altogether.

On the other hand, if the gas flow baffles are of such design as to prevent the flow through the regenerator of sufficient gas to remove the excess heat from the contaminant combustion, the contact material temperature may rise to damaging levels.

Thus it becomes clear that the regenerator gas flow baffles must be of such construction as to cause a pressure drop due to the flow through the regenerator of quantities of gas sufficient to support contaminant combustion and to properly control the contact material temperature, which pressure drop is sufficient to induce the flow of sufficient quantities of gas through the contact material to insure satisfactory burning rates and which pressure drop is below that which would boil the contact material or interfere with its flow through the regenerator.

The $\Delta P$ which would cause boiling of the contact material varies dependent upon the contact material density, being higher for the more dense material. In general this maximum $\Delta P$ may vary from about 4" of water to about 16" of water per foot of shortest vertical path through the contact material. In this connection it should be noted that when baffles such as the angle iron baffles are used, the gas flow through the contact material may be between rows, from under angles of one row up under angles of the next row, in which case the shortest vertical path through the contact material itself may be somewhat less than the vertical distance from row of baffles to row of baffles and should be evaluated for the baffles in question before using the above limits. This is so because of the substantially solid free space formed below the underside of each trough due to the normal angle of repose of the contact material flowing downwardly past the spaced lower edges of each angle baffle.

The $\Delta P$ required to induce a gas flow through the contact material which will cause satisfactory rapid burning rates varies with change in contact material particle size, shape and nature, being generally greater for smaller size particles. In general, the practical lower $\Delta P$ limits should be between about 1" to 10" of water per foot of the shortest vertical path through the contact material depending, as shown, on the above variables and upon the maximum $\Delta P$ limitations as regulated by contact material density.

As an example, it has been found that for clay type catalysts of 4 mm. average diameter and an unpacked apparent density of 0.6, the gas flow baffles should be designed to cause a pressure drop at the proper gas flow rates preferably in the range of from 4" to 7" of water per foot of shortest vertical path through the contact material.

It is often desirable to order to obtain the maximum burning capacity from the regenerator to vary the baffle design in the various burning stages. The pressure drop due to gas flow through the regenerator may be controlled by proper spacing and sizing of the baffles and of the orifices therein and/or by regulation of the slope of the sides of said baffles with the horizontal. The proper design of these variables will vary depending upon the particular application.

All the foregoing illustration of the method of this invention are intended to be merely exemplary and illustrative in character and are in no way intended to limit the scope or application of this invention except as hereinafter limited by the claims. It is apparent that the above apparatus may be used as a reaction vessel as well as a regenerator.

I claim:

1. A method for regenerating particle form contaminant bearing adsorbents by the action of a combustion supporting gas comprising: maintaining a substantially compact, elongated column of downwardly moving adsorbent particles, continuously replenishing said column with spent adsorbent at its upper end and continuously withdrawing regenerated adsorbent from the lower end of said column, introducing a plurality of feed streams of combustion supporting gas, existing at a temperature substantially below the temperature in said column, into said column at a plurality of spaced apart levels along its length, splitting each of said feed streams into two portions, passing one portion of each feed stream in a winding upward direction through said column from the level of its introduction as a plurality of confined tortuous secondary streams from which gravity flow of solid particles is excluded and which are uniformly distributed across said column, said confined secondary streams being open along their undersides to the column so as to permit direct contact between the gas and the solid particles, withdrawing said secondary streams from said column at levels along its length intermediate said levels of gas introduction, similarly passing the other portion of each feed stream downwardly through the column as a plurality of similar confined secondary streams and similarly withdrawing the gas from said last named secondary streams from the column at levels intermediate said levels of gas introduction, controlling the rate of introduction of each of said gas feed streams into said column insufficiently in excess of that required to support the contaminant combustion in the portion of the column through which it flows to cool the adsorbent below an efficient contaminant combustion temperature but sufficient to remove from the column as increased sensible heat in the gas the excess heat liberated by said contaminant combustion, and at the same time maintaining the pressure drop due to gas flow in said secondary confined streams below that which would cause boiling of the adsorbent column but sufficiently high to force a substantial amount of gas from said secondary streams to flow into the column and through the column between the adsorbent particles.

2. A method of conducting the regeneration of a spent moving particle form solid contact material bearing a carbonaceous contaminant which comprises: maintaining a substantially continuous compact column of downwardly flowing particle form solid material throughout a series of regeneration zones which are in free solid material communication with each other, replenishing said column with said spent solid material near its upper end and removing regenerated solid material from the lower section of said column, introducing a combustion supporting gas into one end of each of said regeneration zones at a temperature substantially below the desired range of regeneration temperatures, passing the regeneration gas introduced into any given zone through the column of solid material therein as a plurality of confined, continuous streams from which gravity flow of solid material is substantially excluded but which streams freely communicate with the column of solid material, at least one boundary along their undersides, withdrawing gaseous regeneration products from each regeneration zone adjacent that end thereof which is opposite the end of its introduction and substantially excluding the flow of gas between zones, the gas withdrawn from said confined streams at the ends of said zones being removed from the zones without further flow through the column, maintaining in each of said regeneration zones a balanced relationship between the amount of contaminant combustion conducted in the zone, the rate and temperature of combustion supporting gas introduction to said zone and the pressure drop due to gas flow in said confined streams, wherein the pressure drop due to gas flow in said confined streams is greater than about four inches of water per foot of shortest vertical path through the column and below that which will cause substantial boiling of the compact column when the rate and temperature of combustion supporting gas introduction into said zone is that which, without the aid of any other heat exchange fluid, will insure removal of substantially all the excess heat released by the total contaminant combustion occurring in said zone at an efficient rate without cooling the solid material below an efficient contaminant combustion temperature.

3. In a method for regenerating particle form contact materials bearing a carbonaceous contaminant deposit wherein the contaminant bearing particle form contact material is passed as a substantially compact column downwardly through a series of regeneration zones from the lowermost of which it is withdrawn as regenerated contact material from which the contaminant has been removed by burning the improvement which consists of, introducing an oxygen containing gas into one end of each regeneration zone and withdrawing gaseous regeneration products from the opposite end thereof, regulating the amount of said gas introduced into each regeneration zone and its temperature of introduction to support the desired amount of contaminant burning and also to control the contact material temperature above that minimum necessary for efficient contaminant burning and below that which would cause substantial permanent heat damage to the contact material without the aid of any other heat exchange fluid, flowing the gas through the column in each regeneration zone as a plurality of continuous, uniformly distributed tortuous confined streams from which gravity flow of solid particles is excluded but in which the gas freely contacts the column at surfaces along the undersides of said streams, and causing a substantial portion of the gas flowing through each regeneration zone to enter into the column of solid particles and flow therethrough substantially all along its length but restricting the amount of gas so flowing through the column below that which would cause boiling of the column.

LOUIS P. EVANS.

REFERENCES CITED

The following references are of record in the file of this patent:

UNITED STATES PATENTS

| Number | Name | Date |
|---|---|---|
| 469,849 | Borgarelli | Mar. 1, 1892 |
| 1,150,996 | Carr | Aug. 24, 1915 |
| 1,155,402 | Bornmann | Oct. 5, 1915 |
| 1,784,536 | Pantenburg | Dec. 9, 1930 |
| 1,950,263 | Pellagrino et al. | Mar. 6, 1934 |
| 2,226,578 | Payne | Dec. 31, 1940 |
| 2,286,654 | Simpson et al. | July 16, 1942 |
| 2,303,717 | Arveson | Dec. 1, 1942 |
| 2,320,562 | Bransky | July 1, 1943 |
| 2,330,710 | Hemminger | Sept. 28, 1943 |
| 2,331,433 | Simpson et al. | Oct. 12, 1943 |
| 2,376,365 | Lassiat | May 22, 1945 |
| 2,409,596 | Simpson et al. | Oct. 15, 1946 |
| 2,410,309 | Simpson et al. | Oct. 29, 1946 |
| 2,417,393 | Evans | Mar. 11, 1947 |
| 2,419,245 | Arveson | Apr. 22, 1947 |

Certificate of Correction

Patent No. 2,458,358.                                                                                                January 4, 1949.

LOUIS P. EVANS

It is hereby certified that errors appear in the printed specification of the above numbered patent requiring correction as follows:

Column 2, line 50, for the words "of gas" read *of said gas*; column 8, line 41, for "generator" read *regenerator*; column 10, line 46, for "desirable to" read *desirable in*; column 11, line 20, claim 1, strike out "from" and insert instead *flowing in*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*